United States Patent [19]

Siegrist

[11] Patent Number: 4,760,687
[45] Date of Patent: Aug. 2, 1988

[54] MOWER DECK HEIGHT AND CLUTCH CONTROL

[75] Inventor: Rudolf Siegrist, Valley City, Ohio
[73] Assignee: MTD Products Inc., Cleveland, Ohio
[21] Appl. No.: 56,227
[22] Filed: Jun. 1, 1987
[51] Int. Cl.⁴ .......................................... A01D 34/66
[52] U.S. Cl. ............................. 56/15.8; 56/DIG. 22
[58] Field of Search ............... 56/15.7, 15.8, DIG. 22, 56/15.9

[56] References Cited

U.S. PATENT DOCUMENTS

| | | | |
|---|---|---|---|
| 3,283,486 | 11/1966 | Marek et al. | 56/DIG. 22 |
| 3,483,684 | 12/1969 | Price | 56/DIG. 22 |
| 3,508,386 | 4/1970 | Borchardt et al. | 56/15.9 |
| 3,654,749 | 4/1972 | Ostergren et al. | 56/15.8 |
| 4,102,114 | 7/1978 | Estes et al. | 56/15.8 |
| 4,120,136 | 10/1978 | Rose | 56/DIG. 22 |
| 4,384,444 | 5/1983 | Rossler, Jr. | 56/15.9 |
| 4,563,019 | 1/1986 | Kuhn et al. | 56/15.9 |
| 4,577,455 | 3/1986 | Amano et al. | 56/DIG. 22 |

*Primary Examiner*—Paul J. Hirsch
*Attorney, Agent, or Firm*—Woodling, Krost & Rust

[57] ABSTRACT

An improved mower clutch control is disclosed that transforms part of the upward height control movement of a mower deck into a forward declutching movement by angularly deflecting the mower deck in an arc through use of a pivotally connected lost motion lockout bolt.

10 Claims, 3 Drawing Sheets

MOWER DECK HEIGHT AND CLUTCH CONTROL

FIELD OF THE INVENTION

This invention relates to a selectively-operated integrated mower deck height and blade clutch control mechanism.

BACKGROUND OF THE INVENTION

Riding lawn mowers and tractors are popular due to their reduction of the magnitude of lawn maintenance work. One impediment, however, to their appeal to a segment of the population is the complexity of the various controls of the machines, not to mention the awkward placement and difficulty in operating the controls. A control that is a typical impediment is the mower blade clutch control. Frequently, this clutch control is a small, eight-inch long lever, located underneath the operator (just above the mower deck) at the level of the operator's feet. This clutch lever, when operated, moves the mower deck longitudinally of the mower against the pressure of a large spring to release the driving tension of a belt connected between the engine and the mower deck. This type of clutch control is awkward to use (due to its placement) and difficult to use (due to the shortness of the lever, amount of spring pressure, and weight of the deck). In addition, the operation is inefficient in that deactivation of the mower deck requires the manipulation of the mower blade clutch (to halt the blade) and the mower cutting height control (to raise the deck to avoid scraping the lawn).

The present invention is directed towards providing an easy to manipulate, integrated mower blade clutch and deck height control.

SUMMARY OF THE INVENTION

The present invention is directed to providing an improved operational control for a lawn mower.

It is an object of this invention to improve the efficiency of lawn mower operational controls.

It is an object of this invention to simplify the mower deck related controls.

It is an object of this invention to integrate the mower blade clutch control with the mower deck height control.

It is an object of this invention to reduce the number of parts in a lawn mower.

Other objects and a more complete understanding of the invention may be had by referring to the following specification and drawings in which:

DESCRIPTION OF THE PREFERRED EMBODIMENT

Figure 1:
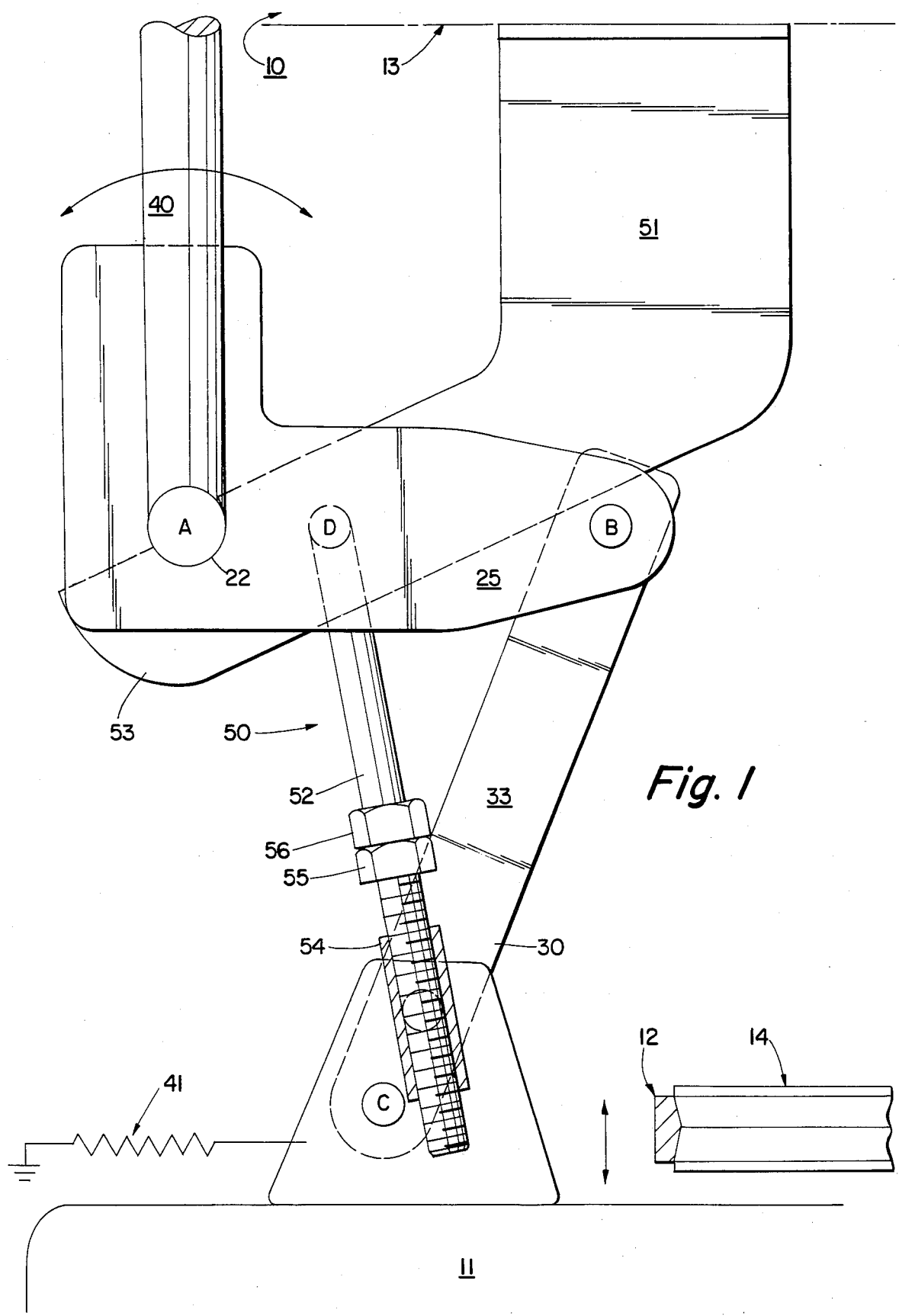
FIG. 1 is an enlarged side view of typical mower height control incorporating a mower blade clutch control.
Figure 2:
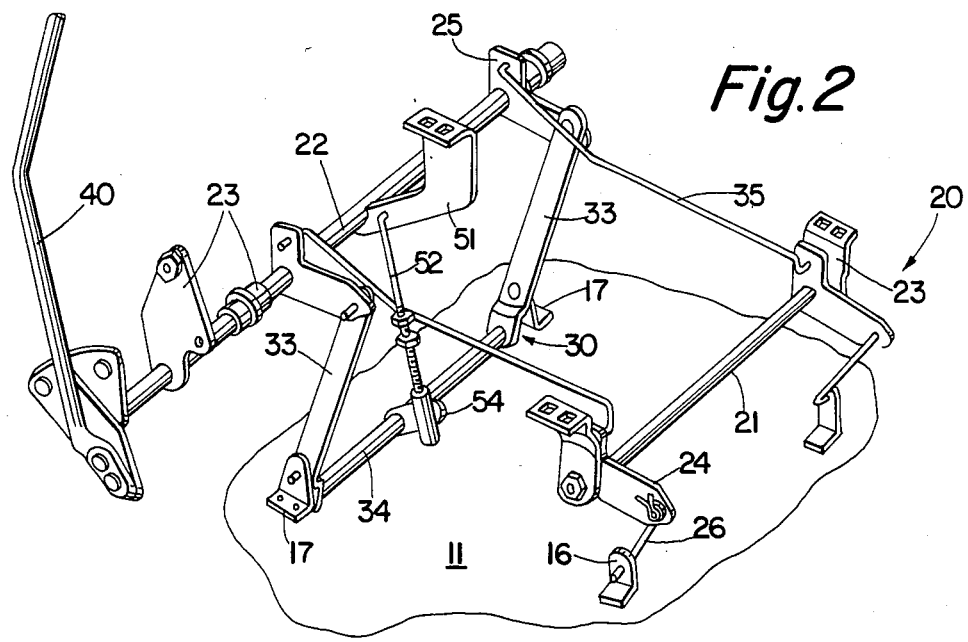
FIG. 2 is a perspective view of the entire mower control of FIG. 1.

This invention relates to an improved operational control for mowers. The invention will be described in the environment of a lawn tractor 10 having a separate, two blade mower deck 11 driven by a belt 12.

The lawn tractor 10 has a frame 13 supported by four wheels (not shown) for passage over the lawn. An engine is mounted to the top of this frame 13 with a drive shaft extending perpendicular to the ground through the frame. The mower deck 11 is mounted to the bottom of the frame 13 between the front and back wheels with a mower blade drive pulley 14 extending upwards therefrom. The mower deck 11 is mounted to the frame 13 utilizing a twin shaft height adjustment mechanism 20.

The twin shaft height adjustment mechanism has two shafts 21, 22 rotatively mounted to the frame parallel to each other via four hangers 23. Each shaft 21, 22 in turn has two "L" shaped deck lift float brackets 24, 25 rotatively mounted thereon. One end of the "L" shaped float brackets 24 on the front shaft 21 are connected via lift links 26 to two mounting tabs 16 on the front of the mower deck 11. These lift links 26 are independent of each other so as to allow the mower deck 11 to move differentially in respect to the front shaft 21. One end of the "L" shaped float brackets 25 on the rear shaft 22 are connected via the lift arms 33 of a stabilizer 30 to two additional mounting brackets 17 on the mower deck 11. The two lift arms 33 of the stabilizer 30 are connected together for common rotation via a torque rod 34. The other arms of the "L" shaped float brackets 25 on the rear shaft 22 are connected to the other arms of the "L" shaped float brackets 24 on the front shaft 21 via two equal length connecting rods 35. Due to the orientation of these shafts, brackets, rods and lift arms/links, any rotation of either the front 24 or rear 25 pairs of float brackets will be transformed into an upwards or downwards motion of the mower deck 11 parallel to the ground. This controls the cutting height of the deck 11. In the embodiment shown, the rotation of the float brackets 24, 25 is controlled by a lift handle 40 connected directly to the rear shaft 22 and by two subsidiary brackets 28 associated with the rear float brackets 25. The subsidiary brackets 28 are welded to the rear shaft 22 next to the float brackets 25. A small tab 29 of each subsidiary bracket 28 underlies its respective float bracket 25. The weight of the mower deck 11 biases the underside of the float brackets 25 against their respective tab 29. Since the mower deck 11 customarily has a positive weight in respect to the tractor any rotation of the rear shaft 22 caused by the lift handle 40 is normally transferred directly into rotation of the float brackets 25 (and upwards-downwards movement of the mower deck 11) as if the float brackets 25 themselves had been directly welded to the rear shaft. The lift handle 40 can be selectively moved and fastened in any angular position so as to accurately control the height of the mower deck 11. Other methods to move the deck 11 upwards and downwards could also be utilized. A lift handle helper spring (not shown) eases the movement of the deck.

Due to the lost motion connection of the float brackets 25 to the rear shaft 22 (by the subsidiary brackets 28), the mower deck 11 can move itself independently upwards of the position set by the lift handle 40. This allows the mower deck to better track the contours of the lawn (i.e. mow high ridges without scraping) and deflect upwards (i.e. move away from a rock in the lawn). This improves the cutting capabilities of the mower.

The mower deck 11 shown has a blade drive engaged backwards position. The mower deck 11 is therefor biased backwards with a deck spring 41 (shown in representational form in FIG. 1). This spring biases the belt 12 between the engine and mower drive pulley 14 into a engaged driving position. Due to this backwards bias the upwards and downwards movements of the mower deck normally would have no effect on the operation of the cutting blades of the mower deck 11. However, the invention of this application integrates the mower blade clutch into the deck height control. This integration is accomplished through the use of a disengagement mechanism 50.

The disengagement mechanism includes a lockout bracket 51 and a clutch lockout bolt 52. The lockout bracket 51 is fixedly mounted to the frame 13 of the tractor in front of one of the lift shafts (in this instance 22) with its free end 53 extending beneath such lift shaft. This bracket 51 provides a convenient fixed mounting location for one end of the clutch lockout bolt 52. The lockout bolt 52 itself extends between the bracket 51 (at point D) and a pivot sleeve 54 mounted to the center of the torque bar 34 of the stabilizer 30. The lockout bolt 52 slides freely axially within the pivot sleeve 54. The bolt 52 does not disengage from the sleeve 54 upon the deck 11 being at its lowest position nor (preferably) even its highest position. An adjusting nut 55 is threaded onto the lockout bolt 52 between the pivot sleeve 54 and lockout bracket 51. A jam nut 56 located above the adjusting nut 55 retains the adjusting nut 55 in a preselected position wherein the position of the adjusting nut 55 defines the operative length of the lockout bolt.

Figure 3:
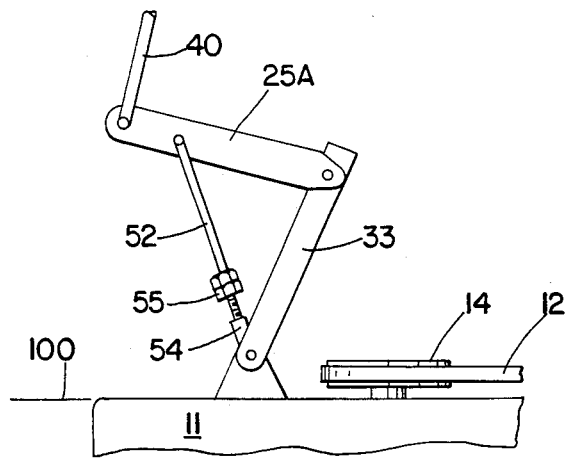
FIGS. 3-6 are side views like FIG. 1 of a modified mower control in various operational positions.
Figure 4:
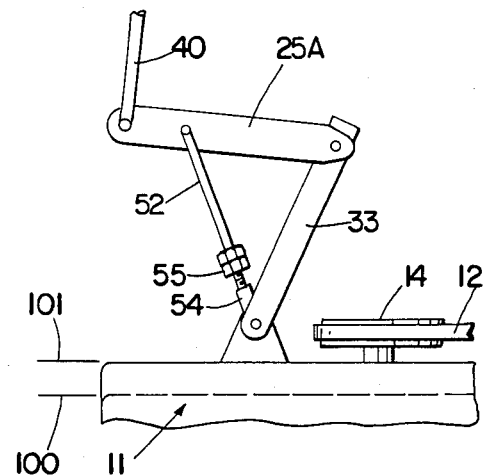
Figure 5:
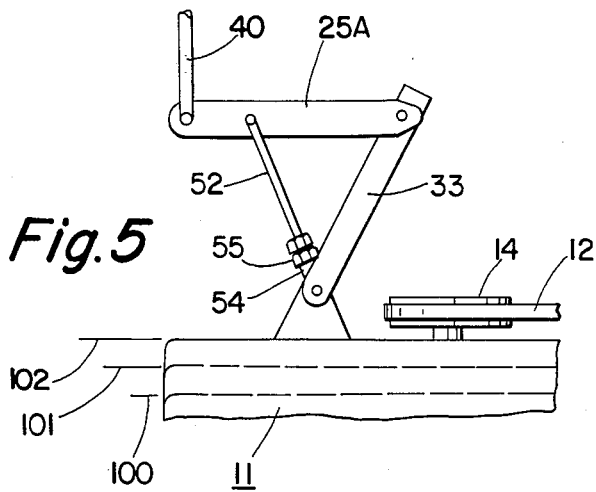
Figure 6:
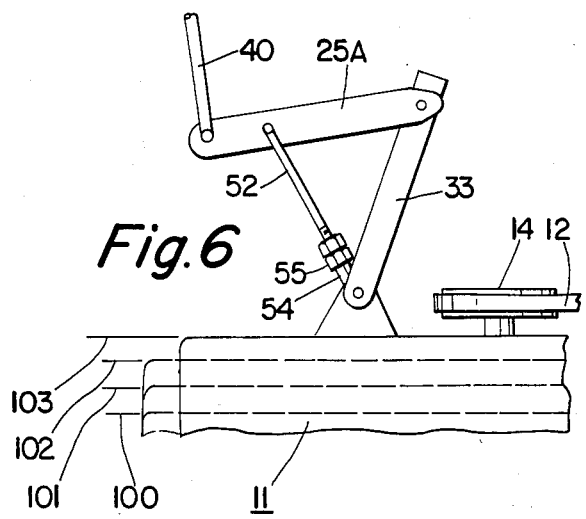
Figure 7:
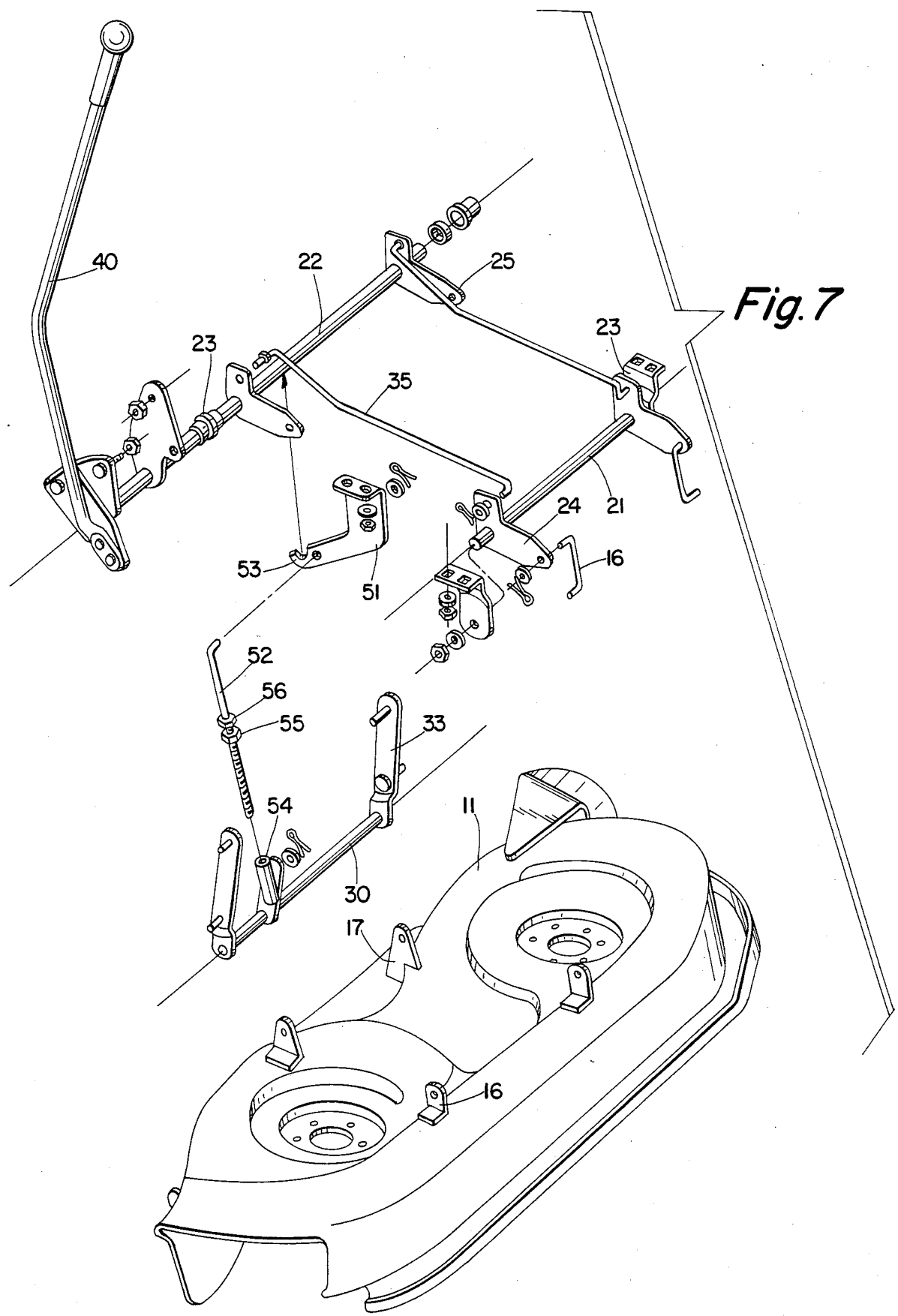
FIG. 7 is a separated perspective view of the mower control of FIG. 2.

The disengagement mechanism is designed to transform at least part of the motion of the mower deck 11 upwards after a certain preset point into a disengaging motion of the blade clutch. The mechanism accomplishes this by deflecting the mower deck. In the embodiment shown and described, when the deck 11 is raised to a position such that the pivot sleeve 54 contacts the adjusting nut 55, part of any further upwards motion of the deck 11 will be translated into a forwards motion of the deck 11, thus disengaging the belt 12 from the drive pulley 14 to declutch the mower deck 11. This declutching occurs because of the geometry of the device. When the pivot sleeve 54 is other than in contact with the adjusting nut 55, the stabilizer 30 is free to rotate about the axis B of its connection with the lift bracket 25, and the distance can vary between the axis A of the lift shaft 22 and the axis C of the connection of the stabilizer 30 to the mower deck 11. Rotation of the shaft 22 is thus transformed into upwards and downwards movement of the mower deck 11. However, when the pivot sleeve 54 is in contact with the adjusting nut 55, the distances between the axis A, B and C are fixedly locked. Therefor any further angular rotation of the lift shaft 22 also rotates the mower deck 11 upwards and forwards in a circumferential arc to disengage the belt blade clutch 12-14. This is shown in the sequential FIGS. 3-6. In FIGS. 3-5 the pivot sleeve 54 does not contact the adjusting nut 55. Rotation of the lift handle 40 therefor smoothly lifts the deck 11 from position 100 (FIG. 3) through position 101 (FIG. 4) to position 102 (FIG. 5). At FIG. 5 the pivot sleeve 54 first contacts the adjusting nut 55. Therefor any further rotation (FIG. 6) moves the deck 11 upwards and forwards to disengage the belt blade clutch (position 103). Upon the rotation of the lift handle 40 in the opposite direction, the movement of the mower deck 11 is reversed (from position 103 through positions 102, 101 to positions 100).

Note that in FIGS. 3-6 the upwards end of the lockout bolt 52 is connected directly to the lift bracket 25A instead of to a separate lockout bracket. This integrated construction, although somewhat less strong than with a separate bracket, illustrates that the invention may take many forms and can be adapted to meet many needs. For example: if one had a clutch that disengaged upon a rearward movement of a mower deck, one would connect the upwards end of the lockout bolt 52 to a bracket 51 forwards of the front end of the stabilizer 30 (i.e. axis order A B D instead of A D B as shown). One could also use a mirror image of the device as shown (i.e. axis B D A). Additional example: if it was difficult to connect the lockout bolt 52 as shown in FIG. 1, one could produce the same action by connecting the bolt 52 at the same angle anywhere else between the mower deck 11 and frame 13.

Therefor, although the invention has been described in its preferred form with a certain degree of particularity, it is to be understood that numerous changes and modifications may be made without departing from the invention as hereinafter claimed.

I claim:

1. An improved control linkage for a lawn mower having a mower deck selectively moveable upwards and downwards in respect to a frame in a range of operative positions and further moveable substantially parallel to the ground to a non-operative position, the control linkage comprising a lockout bolt, said lockout bolt having two ends, one means to connect one end of said lockout bolt to the frame, another means to connect the other end of said lockout bolt to the mower deck, one of said one means or said another means including a lost motion connection, said lost motion connection allowing said lockout bolt to engage between the frame and mower deck when the distance between the frame and mower deck is equal to the operative length of said lockout bolt, said one end of said lockout bolt being displaced from said other end of said lockout bolt in a direction opposite to the movement of the mower deck substantially parallel to the ground to a non-operative position of the mower deck, and said operative length of said lockout bolt being such that the mower deck can be moved freely through its range of operative positions without compromise to the operability of the mower deck while the motion of the mower deck upwards of the range of operative positions connects both of said ends of said lockout bolt to the frame and deck causing said lockout bolt to force the mower deck substantially parallel to the ground to its non-operative position.

2. The improved control linkage of claim 1 characterized in that said operative length of said lockout bolt is adjustable.

3. The improved control linkage of claim 1 wherein the mower deck is selectively moveable upwards and downwards by means of a rotary lift shaft and characterized in that said lockout bolt moves the mower deck in an arc about said one end of said lockout bolt to the non-operative position of the mower deck.

4. The improved control linkage of claim 1 characterized in that said lost motion connection comprises a pivot sleeve, means to connect said pivot sleeve to one of the frame or mower deck, said lockout bolt having an extension beyond its respective end and said extension of said lockout bolt being within said pivot sleeve freely slidable therein at distances between the frame and deck greater than the operative length of said lockout bolt.

5. The improved control linkage of claim 2 characterized in that said lockout bolt is threaded and by the addition of an adjusting nut and said adjusting nut being on said lockout bolt defining an end thereof with the selective movement of said adjusting nut adjusting said operative length of said lockout bolt.

6. The improved control linkage of claim 5 wherein said adjusting nut is on the end of said lockout bolt having said lost motion connection.

7. An improved control linkage for a lawn mower having a mower deck selectively moveable by a rotary control upwards and downwards in respect to a frame in a range of operative positions and further moveable substantially parallel to the ground to a non-operative position, the control linkage comprising a lockout bolt, said lockout bolt having two ends, means to connect one end of said lockout bolt to one of the frame or mower deck, a pivot sleeve, said lockout bolt extending slideably within said pivot sleeve, means to connect said pivot sleeve to the other of the frame or mower deck, the connection of said lockout bolt or said pivot sleeve to the frame being displaced from the connection to the mower deck in a direction opposite to the movement of the mower deck substantially parallel to the ground to a non-operative position of the mower deck, an adjustment nut, means to connect said adjustment nut to said lockout bolt between said one end of said lockout bolt and said pivot sleeve, and said adjustment nut being located in respect to said lockout bolt such that the mower deck can be freely moved through its range of operative positions without compromise to the operability of the mower deck while motion of the mower deck upwards of the range of operative positions connects said adjustment nut to said pivot sleeve causing said lockout bolt to force the mower deck substantially in an arc including the direction parallel to the ground to its non-operative position.

8. The improved control linkage of claim 7 wherein said lockout bolt is threaded and said adjustment nut is selectively moveable on said lockout bolt so as to adjust the extent of the range of operative positions of the mower deck.

9. The improved control linkage of claim 7 characterized in that the connection of one of said lockout bolt or said pivot sleeve to the frame includes a lockout bracket, and said lockout bracket extending off of the frame.

10. An improved control linkage for a lawn mower having a mower deck selectively moveable upwards and downwards in respect to a frame in a range of operative positions by two links connected to a rotary control and further moveable forward to a non-operative position, the control linkage comprising a lockout bolt, said lockout bolt having two ends, said lockout bolt being threaded, means to connect one end of said lockout bolt to said frame, a torque bar, said torque bar extending between the two links, a pivot sleeve, said lockout bolt extending slideably within said pivot sleeve, means to connect said pivot sleeve to said torque bar, the connection of said lockout bolt to the frame being displaced rearwardly of the connection of said pivot sleeve to said torque bar, an adjustment nut, said adjustment nut being threaded onto said lockout bolt between said one end of said lockout bolt and said pivot sleeve, and said adjustment nut being located in respect to said lockout bolt such that the mower deck can be freely moved through its range of operative positions without compromise to the operability of the mower deck while motion of the mower deck upwards of the range of operative positions contacts said adjustment nut to said pivot sleeve causing said lockout bolt to force the mower deck in an arc about said end of said lockout bolt including forward to the decks non-operative position.

* * * * *